Patented Nov. 29, 1932

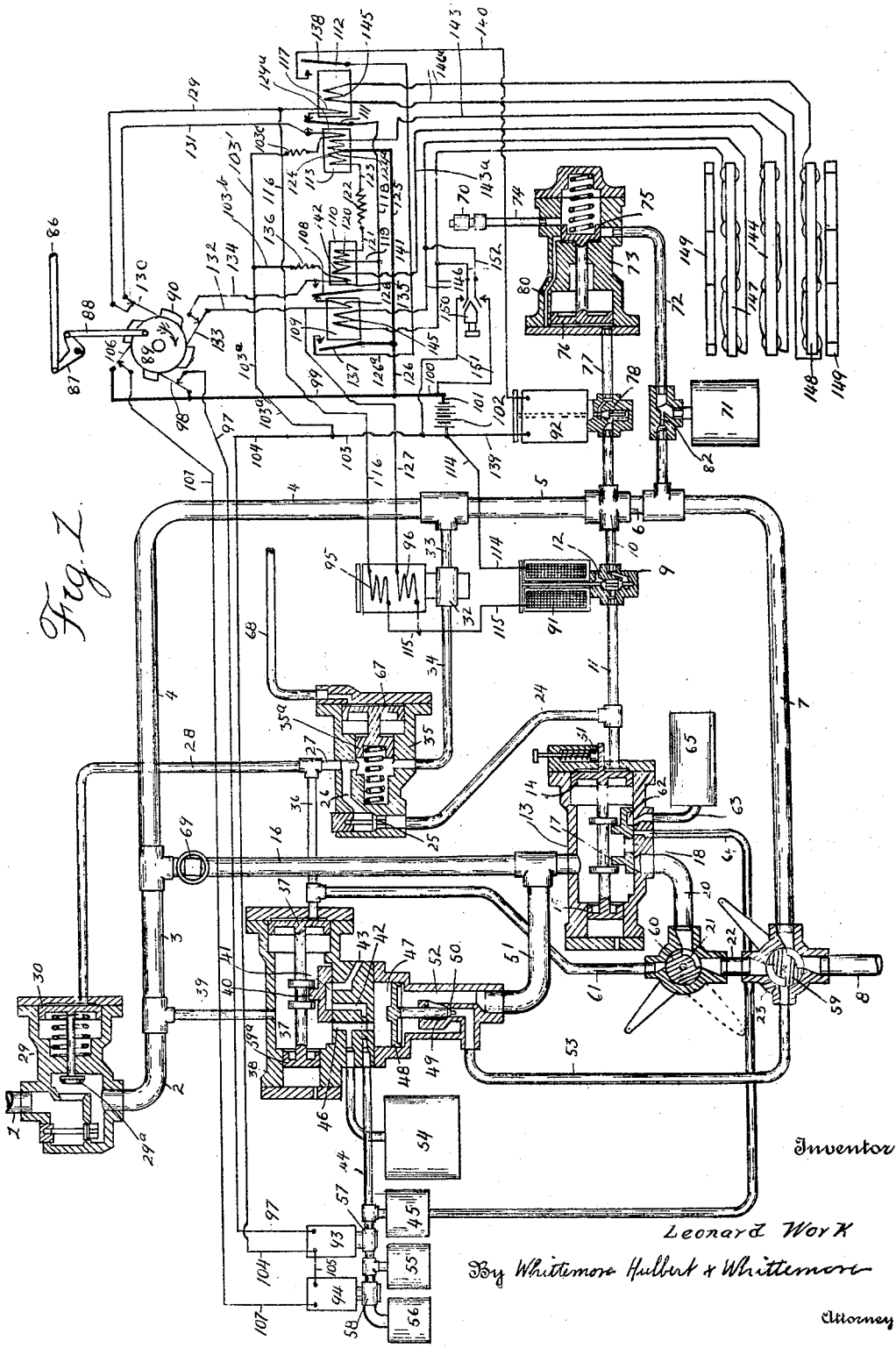

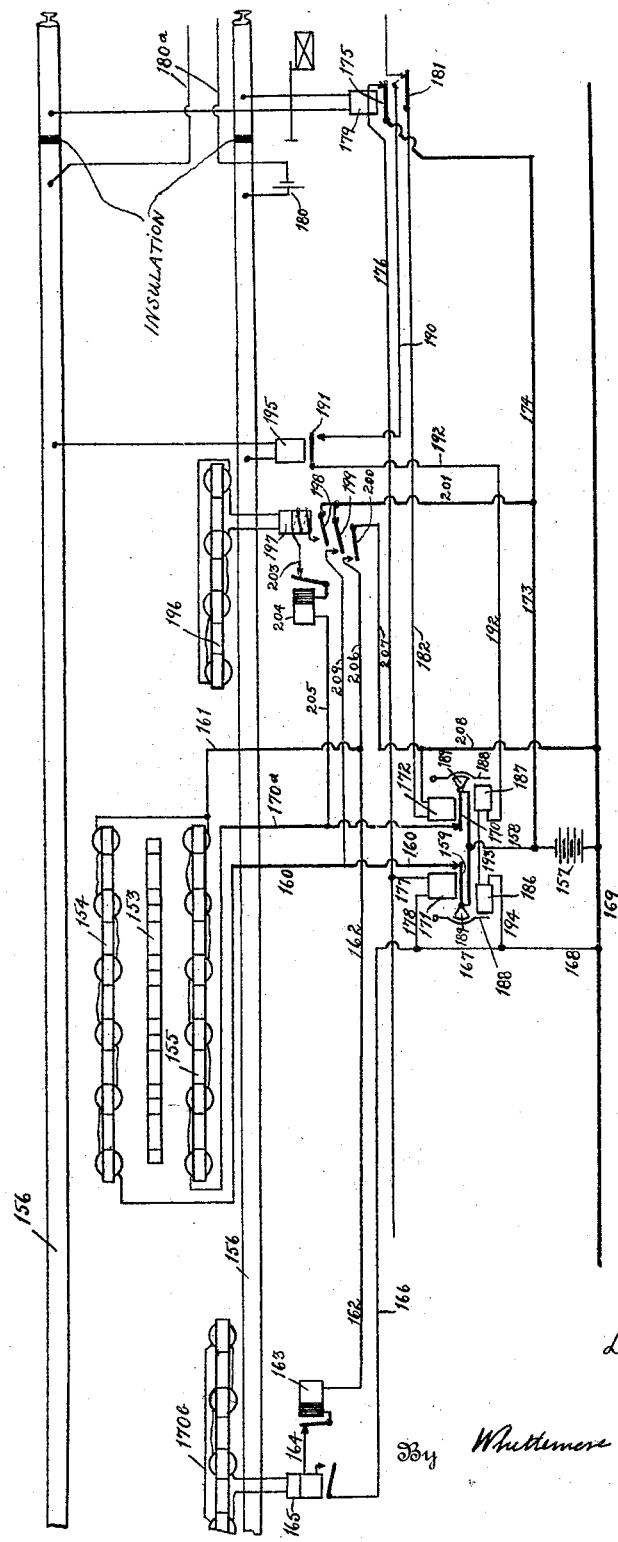

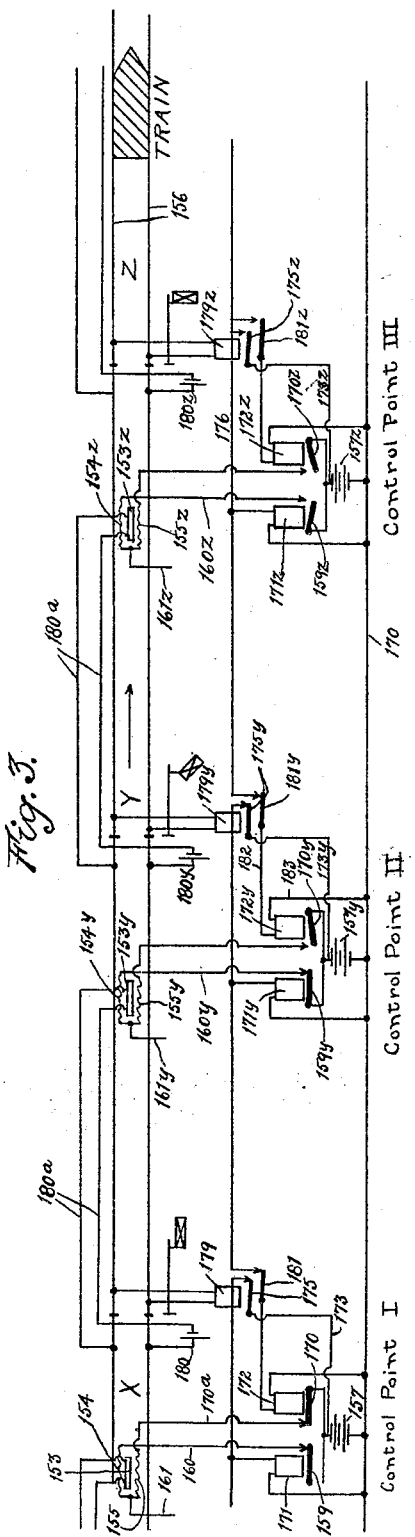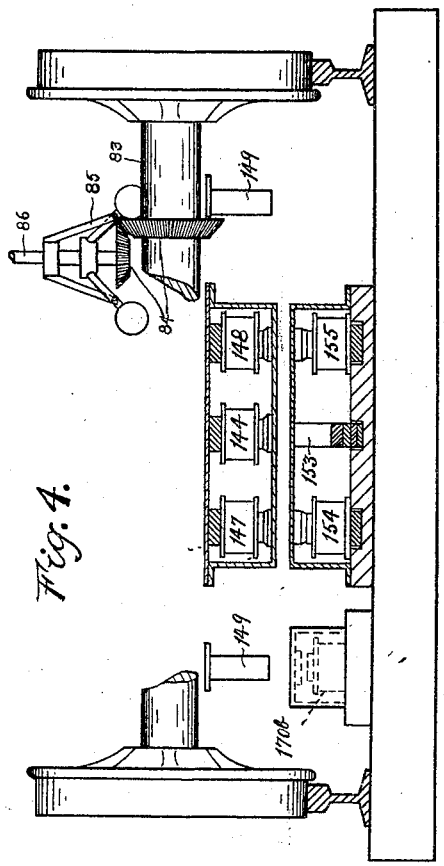

1,889,721

UNITED STATES PATENT OFFICE

LEONARD WORK, OF PHILADELPHIA, PENNSYLVANIA, ASSIGNOR TO SPRAGUE SAFETY CONTROL AND SIGNAL CORPORATION, OF NEW YORK, N. Y., A CORPORATION OF VIRGINIA

AUTOMATIC TRAIN CONTROL SYSTEM

Application filed November 23, 1916, Serial No. 132,972. Renewed April 20, 1932.

The invention relates to automatic train control systems, the present application being a continuation in part of application Serial Number 807,853, filed December 20, 1913.

Among the objects of the system are the following: to automatically apply the service brakes when a train enters a block under conditions where a caution signal would be displayed providing the speed is above a predetermined amount; to automatically apply the emergency brakes when a train enters a block where ordinarily a stop signal would be displayed; to selectively vary the intensity of a service application of the brakes according to the speed of a train, giving high brake cylinder pressures when the speed is high and lower pressures at lower train speeds; to prevent the acceleration of a train subjected to a speed control operation until it passes the next clear signal, i. e. compelling a reduced speed entirely through the block; to permit only the engine in control of the train brakes to be subjected to automatic control in passing control points when more than one engine is attached to the train; to allow engines while in freight service to be limited to a full service (rather than emergency) application of the brakes when automatically applied, and to permit the normal conditions of service and emergency operation to be restored when the engine is in passenger service; to restrain a speed control application of the brakes by the system, when ordinarily it would operate, if the engine man has already applied the brakes; to prevent the release of the brakes by the engine man when applied by the system until the speed has been properly reduced; to allow the brakes to release when the speed has been sufficiently reduced following a service application of the brakes; to apply service brakes to cause a reduction in speed of all trains running above a predetermined rate past a permanent caution signal; to apply the emergency brake on all trains passing a permanent stop signal except at a low predetermined rate; to automatically control trains proceeding only in the normal direction of traffic and to permit trains running counter to the normal direction of traffic to pass freely regardless of speed and condition of track; to indicate by an application of the brakes or otherwise any accidental interruption of electric circuits on the engine; to cause a speed control or stop of a train approaching a block where important parts of the road-way apparatus of the system may have been removed or become defective; to give a signal in the engine when passing a clear signal; and to prevent, after the emergency application, a release of the brakes until the train has been brought to a full stop.

In the accompanying drawing:

Figure 1 is a diagrammatic view of the pneumatic apparatus upon a train showing also the electro-magnetic control means and train circuits;

Figure 2 is a diagram of the track circuits and control mechanism;

Figure 3 is a simplified diagram of the track circuits showing the relation between the installations at the control points;

Figure 4 is a view showing in sectional elevation the members for communicating electro-inductively with a train; and showing the driving mechanism of the speed governor.

The reference characters 1, 2, 3, 4, 5, 6, 7 and 8 indicate successive portions of the brake pipe of a train. The automatic emergency application of the brakes is adapted to be primarily controlled by a valve 9 which since it is electro-magnetically operated will hereinafter be termed "the emergency magnet valve." This valve is adapted to establish communication between pipes 10 and 11, the former communicating with the brake pipe and the latter being provided with a vent passage 12 in the casing of said valve whereby it is opened to the air when said valve is closed. The pipe 11 communicates with a cylinder 13 through one head thereof and within said cylider is mounted a differential piston having a large head 14 and a small head 15. Brake pipe pressure is normally established in the cylinder 13 through the pipe 16 whereby head 14 of the differential piston normally occupies a position in proximity to the cylinder head into which pipe 11 opens. Upon opening of the valve 9 pressure is equalized at both sides of the head 14 and owing to the pressure upon the head 15 the differential piston undergoes displacement. Said piston actuates a slide valve 17 having a port which in the displaced position of the valve is aligned with a passage 20. The train pipe may then vent through the following circuit: 8, 7, 5, 4, 16, 20, 21, 22, and 23, 23 being the outlet to the atmosphere and being proportioned to allow escape of the air at the desired rapid rate.

Opening of the valve 9 also allows air from the brake pipe to follow the path 11, 24, check valve 25, 26, 27 and 28. The pipe 28 opens into a cylinder formed in the casing 29 of a valve 29$^a$, the stem of which valve carries a piston 30 disposed within said cylinder. The valve 29$^a$ is normally spring held from its seat and is adapted to be seated through pressure transmitted to the piston 30 through the pipe 28. By closing the valve 29$^a$ simultaneously with opening of the emergency valve the engine-man's brake valve (not shown) is cut off from communication with the train pipe and interference on the part of the engine-man with automatic emergency braking is prohibited.

When the differential piston 14, 15 undergoes displacement, a spring-pressed bolt 31 drops behind said piston preventing return of the same to its normal position. Since said bolt is accessible only from the ground the train is compelled to come to a full stop before there can be any interference with venting of the train pipe.

Automatic application of the service brakes is primarily controlled by a valve 32 which since it is electro-magnetically operated will hereinafter be termed "the service magnet valve." This valve is adapted to establish communication between pipes 33 and 34, the former having communication with the brake pipe. Similarly to the valve 9, the service magnet valve maintains the pipe 34 vented to the atmosphere when said valve is closed. The pipe 34 communicates with the casing 35 of the cut off valve 35$^a$ and when said valve is opened, the pipes 34 and 28 communicate through said casing whereby the non-release valve 29 may be closed. Also upon opening of the service magnet valve, air flows through 34, 35 and 36 and exerts pressure against the large head 37 of a differential piston mounted in a casing 38. Said casing has communication through a pipe 39 with the brake pipe and consequently the piston normally occupies the position shown in Figure 1. Upon equalization of the pressure at both sides of the head 37 resulting from opening of the service magnet valve, the differential piston is displaced due to pressure acting on the smaller piston head 39$^a$. Said piston actuates a slide valve 40 formed with a chamber 41 which in normal position of the valve establishes communication between a passage 42 and a vent passage 43 opening to the atmosphere. The passage 42 connects through a pipe 44 with a reservoir 45. Upon a displacement of the differential piston communication is established by the chamber 41 between the passages 42 and 46, the latter opening into a cylinder 47 below the casing 38. Within said cylinder is mounted a piston 48 carried by the stem of a valve 49. Normally the valve 49 is maintained seated by brake pipe pressure acting upon piston 48 through the passage 46. When, however, communication is established between the passages 42 and 46 the air above the piston 48 is permitted to expand through the passage 42 and pipe 44 into the expansion reservoir 45, thereby decreasing the pressure above said piston to a predetermined extent and causing a definite opening of the valve 49. Upon un-seating of said valve there is a flow of air from the train pipe through pipes 16 and 51, chamber 52, past valve seat 50 and through pipe 53 to the outlet 23, and therefore a service application of the brakes ensues proportioned to the degree of opening of the valve 49. In order that the movement of this valve may not be too sudden a container 54 which may be termed the equalization reservoir has communication with the space above the piston 48.

To permit the intensity of the application of the service brakes to be selectively increased there are provided two additional expansion reservoirs 55 and 56 which are adapted to communicate with the pipe 44 respectively through the valves 57 and 58, said valves being normally closed. It will be apparent that by opening the valve 57 the air above the piston 48 is allowed to expand to a greater degree and that a still greater expansion is permitted when valve 58 is also opened. Thus the three expansion reservoirs constitute a provision for three different degrees of opening of the service valve corresponding to three different intensities of brake pressure.

The valve 59 in the casing of which for convenience the discharge outlet has been located constitutes a cut-out cock which may be employed to discontinue automatic control of the brakes for any engine when another engine in the train is controlling them so that the speed control system may be made effective only on the engine in control of the train brakes.

60 is an angle valve which may be adjusted when an engine is transferred from passenger service to freight service so that a full service application of the brakes will result when either the emergency magnet valve or service magnet valve is opened. This provision is necessary because on a long freight train a sudden application of the emergency brakes creates a serious risk of damage to the cars and under certain conditions may even wreck the train. When the angle valve 60 is adjusted to the position indicated in dash lines in Figure 1 the pipe 20 is cut off from the outlet 23 and is placed in communication with pipe 61 so that the brake pipe pressure transmitted through the cylinder 13 will be applied by way of pipes 20 and 61 to the differential piston of the service valve to produce an application of the brakes as has already been described. At the same time a closure of the non-release valve will be effected by the flow of air through 20, 61, 36 and 28.

In order that a service application of the brakes may have the maximum intensity when the angle valve 60 is adjusted for freight service, there is provided an extra chamber 62 in the valve 17 and in the displaced position of said valve communication is established through said chamber between pipes 63 and 64. Pipe 63 connects with a reservoir 65 having a capacity equal to that of both reservoirs 55 and 56 and the pipe 64 communicates with reservoir 45. Thus it is seen that the emergency valve when displaced allows a total expansion of the air above the piston 48 equal to that resulting from placing the three reservoirs 45, 55 and 56 in communication with the space above said piston.

In a system making provision for automatically applying service brakes it is desirable to avoid such an automatic operation of the brakes as would interfere with the service application of brakes by the engineman. To avoid such an occurrence the cut-off valve 35$^a$ is provided. Said valve is normally spring-pressed to open position but carries a piston head 67 which is adapted to be subjected to air pressure from the brake cylinder on the tender through a pipe 68 when the engine-man has applied the brakes. The pressure thus acting on the piston 67 will shift the valve 35$^a$ to closed position and will prevent venting of the train pipe as the result of opening of the valve 32.

In case the system should at any time become defective through leaking or jamming of the automatic valves it is necessary to enable the engine-man to prevent venting of the train pipe by the system. For this purpose there is provided in the pipe 16 a valve 69 which will be preferably incased in glass (not shown) so that access can be had to said valve only through breaking the glass.

It may be desirable to have in connection with this system as an aid to the engine-man in foggy or stormy weather a locomotive cab system which will indicate when passing a clear signal. Such a signal is provided having the nature of a whistle 70, the same being adapted to receive a supply of air from a reservoir 71. The flow of air from said reservoir to the whistle is through a pipe 72, a valve casing 73, and a pipe 74. A valve 75 in said casing normally cuts off the air from the whistle and is spring-held in its closed position. Upon the stem of said valve is mounted a piston 76, reciprocatory within a cylindrical portion of the casing 73. Air under brake pipe pressure is adapted to be conducted through a pipe 77 to the casing 73 to act upon said piston and thereby open said valve. The flow of air through the pipe 77 is controlled by a valve 78 normally closed. Since provision is made for opening the valve 78 only for a very brief interval the air pressure transmitted through the pipe 77 is relied upon only to initially open the valve 75, and to hold the same open, air pressure is transmitted from the whistle reservoir 71 through a restricted passage 80 to the cylinder containing the piston 76. The location of the passage 80 is such, however, as to prevent air pressure in the whistle reservoir acting upon the piston 76 until after valve 75 has been opened. The whistle will blow for a definite brief interval of time determined by the capacity of the reservoir 71. When the pressure in said reservoir has sufficiently lowered, the valve 75 will be closed by its co-acting spring and said reservoir will be gradually replenished through the restricted passage 82. The supply of air through the passage 82 is too gradual to maintain the valve 75 open after the pressure in cylinder 71 is lowered.

While it may be noted that the service valve 40 is unavoidably operated simultaneously with each operation of the emergency valve such operation plays no part in the system and is of no importance.

Speed governor mechanism

From one of the engine axles 83 (see Figure 4) rotation is transmitted through a pair of gears 84 to a centrifugal governor 85, which governor is adapted to produce a longitudinal movement of a rod 86 proportioned in its extent to the velocity of the train. The movement of the rod 86 is transmitted through a bell crank 87 to a pitman 88 and through said pitman to a revoluble disk 89. Thus it is seen that the position of the disk 89 at any time is determined by the velocity of the train, said disk being rocked through an angle increasing in a direct proportion with the increase in the speed of the train. Upon the periphery of said disk there is provided a number of cam members 90, the function of which is hereinafter explained.

Electro-magnetic control of pneumatic apparatus

The valves 9, 78, 57 and 58 are respectively controlled by electro-magnets 91, 92, 93 and 94 and the valve 32 is controlled by a two-coil electro-magnet 95, 96. All of said magnets with the exception of 92 are contained in normally closed circuits and their energization is depended upon to maintain the corresponding valves closed. This is an important safety feature of the system since if any of said normally closed circuits are accidentally broken this condition is automatically made known due to the opening of the corresponding valve and the resulting application of the brakes. The circuit of the magnet 93 may be traced as follows: 93, 97, contacts 98, 99, 100, 101, battery 102, 103, 104. The circuit for magnet 94 is as follows: 94, 105, 104, 103, battery 102, 101, 100, 99, contacts 106, 107. The contact 98 is arranged to be opened by one of the cam members 90 of the disk 89 when said disk assumes a position corresponding to some definite speed as for example, 40 miles an hour, and the contact 106 is arranged to be opened at a definite higher speed as for example 55 miles an hour. Thus when an automatic service application of the brakes takes place at a speed of over 40 and under 55 miles the magnet 93 will be de-energized and the valve 57 opened and consequently an auxiliary expansion reservoir 55 will co-act with the reservoir 45 to produce an increased opening of the valve 49 and a correspondingly increased intensity in the application of the brakes. Also when an automatic service application of the brakes takes place at a speed of over 55 miles the valve 58 will be opened and the intensity with which the brakes are applied will be increased to a still greater degree.

Control of the circuits of the magnets 91, 95, 96 is effected in part by the speed governor disc 89 but primarily by two alternating current relays, one of which comprises an armature 108 and magnets 109 and 110 for alternatively attracting said armature while the other relay comprises and armature 111 and cooperating magnets 112 and 113. Said circuits which these relays control may be traced as follows: battery 102, 114, 91, 115, 95, 116, 117, 111, 120, 121, 122, 123, 124, 125, 126, 100 and 101. In parallel with the portion 95, 116, 117, and 111 of this circuit there is a branch which may be traced as follows: 96, 127, 128, 108. Thus it is seen that each of the coils 95 and 96 is in a branch circuit together with one of the armatures 108 and 111, the two said branch circuits being in series with the coil 91. By virtue of these conditions the service magnet valve will open when either of the armatures 108 and 111 is displaced from the normal position disclosed in Figure 1 (since de-energization of one of the coils 95, 96 results), while the emergency magnet valve will not open until both the armatures 108 and 111 are displaced from their normal positions, thereby opening both branches of the circuit of which the magnet coil 91 forms a part. It is clear therefore that whether the valves 9 and 32 are closed or opened depends upon whether or not the coils 91 and 95, 96 are energized or de-energized and this depends upon whether the armatures 108 and 111 are in their normal or displaced positions. The position of said armatures depends upon the selective energization of the relay magnets 109, 110, 112, and 113 and it will hereinafter be shown that the selective energization of said magnets is automatically controlled by track conditions. The track conditions may be such as to produce a displacement of one of the armatures from its normal position even when the train is proceeding at a moderate rate of speed. Such a movement of only one of the armatures would tend to de-energize one of the windings 95, 96 and produce a service application of the brakes. It is not necessary, however, that this should occur when the speed of the train is moderate and provision is therefore made to prevent such an occurrence. With the governor disk 89 there are associated contacts 130 and 133 which are permitted by said disk to remain closed when the speed of the train is under some predetermined limit as for example 25 miles an hour. When this limiting speed is reached by the train the contacts 130 and 133 are simultaneously engaged by two of the cams 90 of said disk and the circuits including said contacts are therefore opened. These circuits may be traced as follows: 102, 114, 115, 95, 116, 129, 130, 131, 111, 118, 119, 120, 121, 122, 123, 124, 125, 100 and 101. In parallel with the portion 95, 116, 129, 130, 131, 111 and 118 of this circuit is a branch traceable as follows: 96, 127, 132, 133, 134, 108. It will be seen that the circuits just traced are closed only when the armatures 108 or 111 are shifted from their normal positions and even when the armatures are so shifted, said circuits will not be closed if the speed of the train is above 25 miles an hour.

Since under normal track conditions neither of the main windings of the relay magnets are energized, some provision is necessary to retain the armatures 108 and 111 in either their normal or displaced positions without vibration of said armatures. To secure this result the magnets 109 and 112 respectively carry auxiliary windings 128 and 117, the normally closed circuits of which have already been described. For the same purpose the magnets 110 and 113 are respectively provided with auxiliary windings 135 and 129$^a$, a circuit of which may be traced as follows: battery 102, 103, 103$^a$, 103$^b$, 136, 135, 108, 119, 121, 122, 123, 124, 125, 126, 100 and 101. In parallel with the portion 103$^b$, 136, 135, and 108 of this circuit there is the following branch: 103′, 103$^c$, 129$^a$, 111 and 118.

The fact that the main windings of the two magnets 109 and 112 are energized only when there is a clear track ahead as the train passes a control point is utilized to energize the signal valve magnet 92 when the conditions are as just defined. With the magnets 109 and 112 there are associated extra armatures 137 and 138 which are in series with each other and with the coil 92, the circuit being traceable as follows: 102, 101, 100, 126, 126ª, 137, 141, 138, 140, 92, 139. When the magnets 109 and 112 are simultaneously energized the circuit just traced is closed by the armatures 137 and 138, the magnet 92 is energized and the valve 78 is opened, whence operation of the whistle results as has been already described.

The main winding of magnet 110 is indicated at 142, 120, and that of magnet 113 is indicated at 124ª, 124. These windings are in series with each other and with an inductance 144, the circuit being traceable as follows: 144, 143, 124ª, 124, 123, 122, 121, 120, 142, and 143ª. The main winding of magnet 109 is indicated at 145 and is in series with an inductance 147 in a circuit 146. The main winding 145 of the magnet 112 is in series with an inductance 148 in a circuit 146ª. The inductances 144, 147 and 148 are arranged in proximity to each other beneath the tender and in a definite spaced relation to the track. At each side of this group of inductances there is mounted an inductor 149 which is of the permanent or magneto type.

The main windings of the magnets 109 and 112 produce greater energization than those of the magnets 110 and 113. The former magnets may be known as the restraining magnets and the latter as actuating magnets. It will hereinafter be shown that when passing any clear control point, both restraining magnets are energized, as well as the actuating magnets, the armature responding always to the restraining rather than the weaker actuating magnets. Thus, when either of the armatures 108 or 111 of the alternating current relays is displaced by energization of the corresponding actuating magnet, said armature will be returned to its normal position at the next clear control point reached by the train through energization of the corresponding restraining magnet. After an emergency application of the brakes both of said armatures will be displaced from their normal positions and if they are both allowed to return simultaneously to their normal positions at the next control point reached by the train both branches of the circuit containing the magnet 91 will be momentarily opened and an un-intentional application of emergency brakes will result. To prevent such an occurrence there is provided in the cab in the engine a restoring button 150 which is adapted to close a circuit through the main winding of the restraining magnet 109, said circuit including the wires 151, 152, 101 and 146. The momentary closing of said circuit by the restoring button will produce the immediate return of armature 108 to its normal position and armature 111 will regain its normal position when the next clear control point is reached.

Track circuits

The inductances 144, 147 and 148 are respectively adapted to cooperate with inductors 153, 154, and 155, (see Figures 3 and 4) a set of which inductors is provided between the track rails 156 at each control point, the control points being provided at the entrance to each block. The installation for only one control point is shown in Figure 2 but in Figure 3 there are shown control points I, II and III located respectively at the entrances to blocks $x$, $y$ and $z$.

Referring most particularly to Figure 2, the electro-magnetic inductors 154 and 155 are adapted to be energized by battery 157 located at the same control point as said inductances. The energizing circuits may be traced as follows: battery 157, 158, 159, 160, inductance 154, 161, 162, winding and armature of relay 163, 164, one of the windings and armature of double wound relay 165, 166, 167, 168, and 169. 169 is a conductor paralleling the track and common to all the control points. In parallel with portion 159, 160 and 154 of said circuit is a branch 170, 170ª, and 155. Thus it is seen that the inductances 154 and 155 are respectively in circuits which may be independently opened or closed by the members 159 and 170 respectively, and which circuits may be opened or closed in common at the relays 163 and 165. The other winding of the relay 165 is adapted to be energized by an inductance 170ᵇ, positioned between the rails 156 just to the rear of the inductors 153, 154 and 155 and adapted to cooperate with one of the inductors 149 upon the train as the latter passes a control point.

The members 159 and 170 respectively form the armatures of relay magnets 171 and 172 and energization of said magnets is necessary to close the circuits which include said armatures. Therefore energization of the inductances 154 and 155 is dependent upon the energization of magnets 171 and 172 respectively. The circuit of any magnet 171 is local to its control point and may be traced as follows: battery 157, 173, 174, 175, 176, 177, winding 171, 178, 167, 168, and 169. The circuit of each magnet 172 extends between the control point at which said magnet is located and the next control point in advance, and said circuit may be traced as follows: (see Figure 3), battery 157ᶻ, 173ᶻ, 175ᶻ, 176, 181ʸ, 182, 172ʸ, 183 and 170. The members 175 and 181 are the armatures of a relay magnet 179, one of which is provided at each control point and is connected across the rails of the block at the entrance to which said control point is located. Across said rails there is also connected a battery 180ʸ, (not shown in Figure 2 but to be found in Figure 3) to energize the track circuit which includes said relay 179. The track circuit for each block has a portion 180ª which is normally closed through the permanent inductor 153 at the control point next in advance of said block.

For reasons hereinafter explained it is desirable to prevent the immediate opening of the circuits which include the armatures 159 and 170 when the circuits of their respective relay magnets 171 and 172 are broken. To secure this result relay magnets 186 and 187 are respectively associated with the magnets 171 and 172 and are respectively provided with armatures 188 having arcuate portions adapted to frictionally engage segmental portions 189 of the armatures 159 and 170. Thus it will be seen that when the magnets 186 and 187 are energized and attract their armatures the latter will act to maintain the armatures 159 and 170 in circuit closing positions independently of their respective relay magnets 171 and 172. The circuit for the magnets 186 and 187 may be traced as follows: (see Figure 2), battery 157, 173, 174, 175, 190, 191, 192, 187, 193, 186, 194, 168 and 169. 191 is the armature of a relay magnet 195, one of which is connected across the rails at each control point and is normally energized by the track battery 180.

Just in advance of each set of inductors 153, 154, and 155 there is located between the tracks an inductance 196 which is adapted to cooperate under certain conditions hereinafter explained with one of the inductors 149 of the train. In circuit with said inductance is one of the windings of a double wound relay 197 having three circuit closing armatures 198, 199 and 200 respectively. The circuit closed by armature 198 may be traced as follows: battery 157, 173, 201, 198, the other winding of relay magnet 197, 203, armature and winding of relay magnet 204, 205, 170ª, 155, 161, 206, 200, 207, 208, and 169. The circuit controlled by armature 199 may be traced as follows: battery 157, 173, 201, 199, 209, 160, 154, 161, 206, 200, 207, 208, 169.

*Complete operation*

Let it first be assumed that the block Z is occupied by a train as is indicated in Figure 3. Then relay magnet 179ᶻ will be short circuited by the axles of said train and armatures 175ᶻ and 181ᶻ will assume open circuit positions. Since said armatures are respectively interposed in the circuits of relays 171ᶻ and 172ᶻ energization of said relay magnets is prohibited. Energization of the inductances 154ᶻ and 155ᶻ is also prohibited since their circuits are controlled by the armatures of said relays. Consequently if another train attempts to pass control point III and enter the block Z which is already occupied neither inductance 147 or 148 will be energized but the permanent inductor 153ᶻ will energize inductance 144. From this it follows that alternating current relay magnets 110 and 113 will be energized while there will be no energization of the restraining relay magnets 109 and 112. Therefore the two armatures 108 and 111 will be displaced from their normal positions and the circuit of magnet 91 will be broken. This will result in opening the emergency valve 9 and in an application of the emergency brakes and automatic stopping of the train which is attempting to pass control point III.

The conditions at control point II resulting from the presence of a train in block Z will now be considered. Block Y being unoccupied the relay magnet 179ʸ is energized and the circuit of relay magnet 171ʸ is closed. The circuit of relay magnet 172ʸ is maintained open by the armature 175ᶻ and therefore relay magnet 172ʸ is de-energized. From this it follows that inductance 154ʸ may be energized as a train passes control point II while inductance 155ʸ must be de-energized. Hence as a train passes said control point inductance 144 will be energized by the permanent inductor 153 at said point. The inductance 147 will also be energized by inductor 154ʸ, while inductance 148 will not be energized. Hence the alternating current relay magnets 110, 113, and 109 will be energized and the last mentioned magnet will act to prevent displacement of armature 108 from its normal position. Magnet 112 not being energized armature 111 will be attracted by its actuating magnet 113. From this it follows that only one of the coils 95, 96 will be de-energized and the coil 91 will not be de-energized. Since energization of both coils 95, 96 is requisite to maintain the service magnet valve 32 closed said valve will open producing a service application of the brakes and automatically reducing the speed of the train passing control point II.

It is to be understood, however, that the production of a service application of the brakes by the system will not take place as described if the speed of the train in passing control point II is less than 25 miles. This is for the reason that the circuits including the contacts 130 and 133 are not opened by the governor disk 89 until the speed of the train is in excess of 25 miles. Hence when armature 111 is displaced from its normal position as the train passes control point II the circuit including the path 111, 117, 116, and 95 is broken only momentarily and is continued in the new position of said armature through the path 111, 131, 130, 129, 116, 95. The momentary interruption of the circuit through the coil 95 during displacement of said armature will effect only a momentary opening of the valve 32 and a similar action takes place with reference to the valve 49. Since the latter requires to be opened several seconds before a brake pipe reduction sufficient to operate the brakes will be made, momentary de-energization of the winding 95 will have no appreciable effect.

If the speed of the train in passing control point II while block Z is occupied is above 25 miles and under 40 miles the circuits including the contacts 130 and 133 will be broken by the governor disk 89 and therefore when coil 95 is de-energized through displacement of armature 111 it will remain de-energized and the resulting service application of the brakes will be proportionate in its intensity to the capacity of the expansion reservoir 45. If the speed of the train is between 40 and 55 miles the intensity of the application of the brakes will be increased proportionately to the combined capacity of the reservoirs 45 and 55, while if the speed is over 55 miles the intensity of the application of the brakes will be proportionate to the combined capacity of the three reservoirs 45, 55 and 56.

Considering now the conditions at control point I when block Z is occupied it is seen that both of the relays 171 and 172 are energized since blocks X and Y are un-occupied and track relays 179 and 179$^y$ are energized. Consequently as a train passes control point I all three inductors 153, 154, and 155 will be energized and all three inductances 144, 147, and 148 will also be energized. Energization of both relay restraining magnets 109 and 112 will therefore act to retain armatures 108 and 111 in their normal positions despite the pull of the actuating magnets 110 and 113, and there will be no interruption of the circuits of the magnets 91 and 95, 96.

The function of the inductance 170$^b$, co-operating inductor 149 and relays 163, 165 shown in Figures 2 and 3 is to reduce to a minimum the consumption of current in the circuit of the inductances 154 and 155. The system is such that the circuit of inductor 154 is closed through the armature 159 except when there is a train in the block at the entrance to which said inductor is located. Furthermore the circuit of the inductor 155 is closed through the armature 170 except when there is a train in either of the two blocks in advance of the control point at which said inductor is located. But energization of said inductors is useful only during the momentary interval of the passage of the inductances 147 and 148 above said inductors. By the provision of the relays 163 and 165 controlling the circuit of said inductors and the inductor 149 and inductance 170$^b$ controlling said relays, the circuits of the inductors are maintained closed only during the necessary interval. Just before the set of inductances upon the train passes over the track inductors one of the inductors 149 passes over and energizes inductance 170$^b$ momentarily. The relay magnet 165 is thus momentarily energized and the movement of its armature to circuit closing position energizes the other winding of said magnet so that the circuit may remain closed after inductor 149 has lost its co-operative relation to inductance 170$^b$. The circuit continues closed only for a brief interval of time since relay 163 which is of a slow acting type will shortly attract its armature and break the circuit. The interval of energization of said circuit is sufficient however to allow the desired cooperation between the inductors 154 and 155 and the inductances 147 and 148 as the latter pass above the former.

The relays 197 and 204 are identical in type with the relays 165 and 163 and are for the purpose of producing energization of the inductors 154 and 155 for trains running in the reverse direction to normal traffic. Reverse direction movement of trains, which emergency may require, are made without regard to signal indications and must not be hindered by any control system. For this reason it is necessary that a train proceeding in the contrary direction to regular traffic shall encounter only energized inductors. The location of the inductance 196 relative to the track inductors is such that energization of said inductance by one of the symmetrically arranged inductors 149 would take place just before the reversely moving train carried its inductances above the track inductors. The circuits closed by energization of the inductance 196 have heretobefore been traced and it is to be noted that they include the inductors 154 and 155 and are independent of any other control.

The provision of the relays 186 and 187 is necessary to make the control of the system effective on either end of a train. Since trains are sometimes propelled by an engine at the rear as well as at the front it is necessary that the control be communicated to the rear end as well as to the head end and more particularly the control encountered by the front end must be maintained until the rear end passes the control point. Without special provision for this feature when the head of a train passes from one block to another inductors at the adjacent control point would at once assume the protective condition for the block entered and the rear end of the train in passing said inductors would receive a stop control. By provision of the relays 186 and 187 when the circuit of either inductance 154 and 155 is closed through an initial energization of the relay magnets 171 or 172 said circuits are maintained closed through inter-engagement of the armatures 188 and 189, and this condition continues until the last pair of wheels of the train has passed the control point and entered the block at the entrance to which the control point is located. Energization of the relay magnet 195 will then take place causing armature 191 to break the circuit of relays 186 and 187, and the armatures 159 and 170 will be freed from engagement by the armatures 188 whence de-energization of the inductances 154 and 155 will result.

It is one of the requirements of a train control system that the complete removal of any important part of the road-way apparatus shall result in the stoppage of the train. This is taken care of in the present system by including the permanent magnet inductor at each control point in the track circuit of the block ending at said control point so that the removal of the inductors will open said track circuit. This will cause a stop control of the inductors at the entrance to said block and a caution control at the entrance to the preceding block. A failure or removal of any of the circuits controlling the inductors will be indicated by the failure of the inductors to energize and the consequent stopping or caution control on the first train to pass.

It is to be noted that by virtue of the symmetrical arrangement of the inductors and inductances the same come into proper relation regardless of the way the engine is turned or from which direction it approaches.

The actuating windings 142, 120 and 124, 124ª in addition to their regular functions serve also to detect any accidental interruption of the circuit between said windings and the inductance to which they are connected. This is due to the fact that for each actuating magnet the windings form portions of two branches through which current normally flows in opposite directions neutralizing their magnetic effects, but if one of the circuits is broken the neutralizing effect instantly disappears and the armature being attracted will cause an operation of the brakes and call attention to the existence of a defect. The presence of the direct current in the inductances 147 and 148 for the purpose just explained has no detrimental effect.

When it is desired to stop all the trains proceeding at a speed above 10 miles an hour (below which the inductors are not effective) a single series of permanent magnet inductors is located at the desired point. Where a speed control is required on all trains an additional series of permanent magnet inductors is located at the control point to replace the electro-magnet inductors.

While it is not a function of the system to release the brakes they will, however, release when the non-release valve 29ª opens and allows the air from the engineer's valve to charge the brake pipe. The non-release valve is opened by the spring acting upon piston 30 when the air pressure opposing said spring is relieved by venting of pipe 34 at valve 32.

If a train having received a caution control at the entrance to a block attempts to increase speed above the predetermined amount the speed governor contacts will at once open one of the circuits 95, 96 of the service valve controlling magnets and the brakes will be re-applied. This compels a reduced or caution speed entirely through the block and until the next clear signal is passed.

In the preceding specification and the following claims the term "train" is used in a broad sense and is considered to include track vehicles of any sort.

What I claim as my invention is:

1. In a train control system, an inductance carried by the train, an inductor in the path of the train, a circuit including the inductor, a relay for normally controlling said circuit, means acting upon the initial energization of said circuit for maintaining the circuit closed independently of the relay during the passage of a train past the inductor.

2. In a train control system, the combination with mechanism upon a train, of an electro-magnetic controlling device for said mechanism, a circuit for energizing said device, a stationary source of electro-motive force in said circuit, a relay adjacent the path of the train for normally controlling said circuit and means acting after the initial energization of said circuit for maintaining the same closed, independently of said relay during the passage of a train adjacent said relay.

3. In a train control system, the combination with the brake mechanism of a train, of an electro-magnetic control mechanism for the same including an actuating and restraining element, a signal upon the train, means for communicating with the train to energize the actuating element and a common means for communicating with the train to energize the restraining element and the signal.

4. In a train control system, the combination with electro-pneumatic mechanism on a train for stopping the same, electro-magnetic restraining means for the train stopping mechanism, signal mechanism on the train, electro-inductive means for energizing said electro-pneumatic stopping mechanism each time the train passes a fixed point, and a common means for communicating with the train to energize the restraining means and the signal mechanism.

5. In a train control system, the combination with the mechanism carried by a train, of electro-magnetic control means for said mechanism, a pair of inductances for respectively energizing separate elements of said control means, a pair of inductors at a control point in the path of the train to cooperate with said inductances, a circuit for said inductors including the same respectively in parallel branches thereof, means controlled by track conditions in advance of said control point for selectively opening or closing said branches, and means dependent upon the presence of a train at the control point for opening or closing said circuit at a point common to both said branches.

6. In a train control system, the combination with brake mechanism on a train, of means for controlling said mechanism either manually or automatically, and restraining means for said automatic means operable through said manually-controlled means to prevent interference with manual control by the automatic control means.

7. In a train control system, the combination with the brake mechanism of a train, of means for automatically applying the brakes, electro-magnetic control mechanism for said means, means controlled by traffic conditions in advance of the train for energizing said control mechanism, and means carried by the train for proportioning the intensity of braking to the speed of the train.

8. The combination with a track, of a vehicle movable along the same, magnets along the track, a circuit on said vehicle adapted to have electromotive force induced in it by said magnets, and means controlled jointly by said electromotive force and the speed of the vehicle for exerting a controlling influence on the movement of the vehicle.

9. In an automatic train control system for railroads having tracks divided into signal blocks, automatic train control apparatus on a vehicle adapted to be put into condition to control the movement of the vehicle and to continue in such condition until reset, coils on the vehicle for conditioning said apparatus and for resetting it, separate impulse receiving means on the vehicle controlling said coils, a permanent magnet on the track in each block, said magnet being adapted to co-operate with one of said impulse receiving means to condition the train control apparatus for operation, coils associated with each permanent magnet and adapted when energized to render it ineffective to condition said train control apparatus, energizing circuits for the said coils controlled in accordance with conditions in an advance block, an electro-magnet on the track at the exit end of each block for influencing the impulse receiving means to cause resetting of the train control apparatus, and an energizing circuit for each electro-magnet controlled in accordance with conditions in an advance block.

10. In a system of train control, the combination with braking mechanism, of track magnets controllable by traffic conditions and each responsive to such conditions for setting up a local magnetic field, brake-controlling means influenced by the fields of said magnets for effecting one or more brake applications, and means responsive to the movement of the vehicle and co-operating with the braking mechanism for retarding the speed of the vehicle subsequently to an initial brake application.

11. In combination in an air brake system, a valve controlling the air pressure thereto, means operated by air pressure for actuating the valve, track operated means for controlling the air supply to said valve actuating means, means for holding the valve in its actuated position, and means for restoring the valve to normal position including means actuated by air pressure for releasing the said holding means, and means for moving the valve, when released, to normal position.

12. In combination with an engineer's valve, automatic train stopping means comprising a pneumatically operated air release valve, and means operated pneumatically from the engineer's valve for automatically eliminating the functions of the automatic train stopping means when the engineer performs his duty in slowing the train on arriving at a danger signal, said automatic eliminating means being non-accessible for direct hand operation and operable only as a consequence of the braking of the train.

13. In combination, in a train control system, an automatic air release valve with means for setting it to release the air and set the brakes on approaching a danger signal, a disabling device for the engineer's valve consisting of a valve to cut off the air for re-charging the train pipe, air pipe connections for supplying air for operating said air release valve and disabling device, an eliminating valve for cutting off the operating air to the said air release valve and disabling valve, and air supply means for delivering air for operating said eliminating valve, as a consequence of a manual brake application.

14. In combination, an automatic air release valve for setting the brakes, means for operating said valve automatically on approaching a danger signal, an engineer's disabling valve with means for setting the same for disabling the engineer's valve when the automatic air release valve is operated, an eliminating valve for the air release valve and disabling valve and an air supply connection to said valve for operating it, said air supply connection being controlled by the engineer's valve to set said valve in its eliminating position when the engineer's valve is set to reduce speed substantially as described.

15. Automatic train control apparatus for railway vehicles comprising, in combination, train control means adapted to cause an automatic brake application when operated, brake equipment including a brake cylinder, and means operated by pressure existing in said brake cylinder for preventing such brake application by the operation of said train control means.

16. An automatic train control system for railway vehicles comprising, speed control apparatus on a vehicle conditioned for operation from the track-way in accordance with traffic conditions and effective when thus conditioned for operation to apply the brakes of the vehicle thereafter when the speed of the vehicle exceeds a predetermined speed limit under dangerous traffic conditions, and means dependent upon the pressure with which the brakes are applied for preventing such brake application.

17. In an automatic train control system for railroads having tracks divided into blocks each provided with a normally closed track circuit, speed control apparatus on a vehicle including a speed responsive device adapted to apply the brakes thereof under dangerous traffic conditions dependent upon its speed, control means for said apparatus partly on the vehicle and partly along the track and acting to set said apparatus into operation when the vehicle enters a block in the rear of an occupied block, manually controlled brake equipment for the vehicle and, means responsive to the operation of said brake equipment for preventing the brake application by the operation of said apparatus while the brakes are acting.

18. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby for transmitting the impulse to the brake applying means, means responsive to the braking of the vehicle for determining the transmission of the impulse to the brake applying means, and co-operating track impulse creating and vehicle impulse receiving means to restore the shifted transmitting means to normal position after having been moved therefrom.

19. The combination with a track and a vehicle moving thereon, of co-operating track impulse creating and vehicle impulse receiving means, means responsive to the impulse received by the vehicle for effecting a brake application, and means responsive to the pressure applied to brake the vehicle for determining the transmission of the impulse to the brake applying means.

20. The hereinabove described method of train control which consists in creating a condition in which the opposite effects are produced by means responsive to the speed of the train and means responsive to the pressure applied to brake the train, and controlling the movement of the train in accordance with the condition thus created.

21. The combination with a track and a vehicle moving thereon, of cooperating track impulse creating and vehicle impulse receiving means, means responsive to the impulse received by the vehicle for effecting a brake application, and means responsive to the speed of the vehicle and to the braking being effected thereon for determining the transmission of the impulse to the brake applying means.

22. In a train control system the combination of means responsive to the speed of the train and the braking pressure tending to retard the same and means governed thereby for controlling the movement of the train.

23. The combination with a track and a vehicle moving thereon, of cooperating track impulse creating and vehicle impulse receiving means, means responsive to the impulse received by the vehicle for effecting a brake application, and means responsive to the speed of the vehicle and to the pressure tending to retard the same for determining the transmission of the impulse to the brake applying means.

24. The combination with a track and a vehicle moving thereon, of an impulse creating means along the track, receiving means upon the vehicle for the impulse, means on the vehicle for effecting a brake application, transmitting means on the vehicle responsive to the impulse and shiftable thereby for transmitting the impulse to the brake applying means, means responsive to the speed of the vehicle and to the pressure tending to retard the same for determining the transmission of the impulse to the brake applying means, and co-operating track impulse creating and vehicle impulse receiving means to restore the shifted transmitting means to normal position after having been moved therefrom.

25. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position, for transmitting the effect thereof to the brake applying means and for prolonging the effect of the impulse, and means responsive to the speed of the vehicle and the braking being effected thereon for determining the transmission of the impulse so prolonged to the brake applying means.

26. The combination with a track and a vehicle moving thereon, of an impulse creating means along the track, receiving means upon the vehicle for the impulse, means on the vehicle for effecting a brake application, transmitting means upon the vehicle responsive to the impulse and shiftable thereby to a stable position for transmitting the effect thereof to the brake applying means and for prolonging the effect of the impulse, means responsive to the pressure applied to brake the vehicle for determining the transmission of the impulse so prolonged to the brake applying means, and co-operating track impulse creating and vehicle impulse receiving means to restore the shifted transmitting means to normal position after having been moved therefrom.

27. In an automatic train control system, apparatus on a vehicle including a speed responsive device and adapted when set into operation to cause an automatic brake application when the vehicle exceeds predetermined speed limits, said apparatus when set into operation continuing in operation until restored, control means operable manually by the operator for retarding the vehicle, means for preventing an automatic brake application by the action of said apparatus when the control means is in position to retard the vehicle, and traffic control track-way means co-operating with vehicle carried means for setting said apparatus into operation and for restoring it in accordance with traffic conditions.

28. A train control system for railroads having tracks divided into blocks comprising, automatic apparatus on a vehicle including a permissive speed device and an actual speed device and adapted when set into operation to apply the brakes of the vehicle automatically when it exceeds predetermined limiting speeds during its progress through a block, means partly on the vehicle and partly along the track for setting said apparatus into operation near the entrance to a block when the next block in advance is occupied, and means associated with the brake equipment of the vehicle and acting when the brakes are applied to prevent an automatic brake application by the operation of said apparatus.

29. Train control apparatus for railway vehicles comprising, permissive speed means for determining the safe speed limit for the vehicle, actual speed means responding to the speed at which the vehicle is travelling, brake control means governed jointly by said two means for causing an automatic brake application, and means whereby the operator of the vehicle may prevent an automatic brake application at speeds exceeding the safe limit prescribed by said permissive speed means by manually applying the brakes.

30. A train control system comprising a stick relay on a vehicle, means partly on the vehicle and partly on the track for dropping and picking up said relay, a brake setting appliance, means having its operation dependent on the speed of the vehicle and rendered effective to control said appliance when the relay is changed from its normal condition, and means for independently governing the brake setting appliance, to prevent an automatic brake application if the brakes of the vehicle are acting.

31. A train control system comprising, brake control means, automatic means for actuating said brake control means when a predetermined speed is exceeded, and pressure responsive means to prevent the actuation of said brake control means by said automatic means at said speed when the brakes are manually applied.

32. In an automatic train control system, the combination of brake control mechanism adapted when initiated to continue to be effective until restored and acting to establish a low speed limit which the vehicle cannot exceed without an automatic brake application, means partly on the vehicle and partly on the track for initiating and restoring said mechanism, and means effective when the brakes are applied to prevent the brake control mechanism from enforcing such limiting speed.

33. In an automatic train control system the combination of a permissive speed means adapted to determine a limiting speed for the vehicle, actual speed means driven by the wheels of the vehicle, an automatic brake setting appliance, means for actuating said brake setting appliance when the actual speed exceeds the permissive speed, and means to prevent the actuation of said automatic brake setting appliance when the brakes are manually applied.

34. In a train control system for railroads having tracks divided into blocks, the combination with traffic controlled trackway means, means on the vehicle controlled by said trackway means for automatically applying the brakes, and means associated with the braking equipment permitting the engineer to make successive step by step manual brake applications and effective to prevent the actuation of said automatic brake applying means while the brakes are applied.

35. In a train control system, the combination of trackway influence creating means located at successive points along the track for creating brake application and resetting influences, a car carried influence receiving means, automatic means rendered effective by such brake application influences for applying the brakes, and means responsive to the pressure applied to the brakes to determine the actuation of said automatic means.

36. Automatic train control apparatus for railway vehicles comprising, in combination; brake control means adapted to cause an automatic brake application when operated, brake equipment including a brake cylinder, and means responsive to pressure in said brake cylinder for preventing such brake application by the operation of said brake control means.

37. Automatic train control equipment for railway vehicles comprising a normally energized electrically operable brake-setting appliance adapted when deenergized to cause an automatic brake application, apparatus including a speed responsive device driven from the wheels of the vehicle for governing said appliance, and means acting to maintain the brake-setting appliance energized independently of its control by said apparatus when the brakes of the vehicle are acting.

38. In a train control system the combination with a track divided into traffic blocks, brake applying means on the vehicle, track elements located at successive points along the track each causing on the train brake applying influences, and means on the train including speed responsive means driven from the wheels thereof whereby the reception of an influence from one track element controlled by a remote danger condition creates a continuing speed limit which the train cannot exceed without a brake application and the reception of an influence from a track element controlled by an immediate danger condition causes braking at below the speed limit.

39. In an automatic train control system, brake controlling apparatus for railway vehicles adapted to be governed by impulses transmitted from the right of way at each caution signal, comprising means adapted to have its operation prevented by the engineer for causing an automatic application of the brakes, and means for preventing such brake application if the brakes are applied at the time.

40. In a train control system the combination with a track divided into traffic blocks, brake applying means on the vehicle, track elements located at successive points along the track each causing on the train brake applying influences, and means on the train including speed responsive means driven from the wheels thereof and a stick relay controlled by the track element for completing the circuit of the speed responsive device whereby the reception of an influence from one track element controlled by a remote danger condition creates a continuing speed limit which the train cannot exceed without a brake application and the reception of an influence from a track element controlled by an immediate danger condition causes braking at below the speed limit.

41. In a train control system for railroads having tracks divided into blocks, the combination with automatic brake control apparatus on a vehicle adapted when set into operation to continue in operation until restored; means partly on the vehicle and partly on the track for communicating to the vehicle an initiating influence for operating said apparatus when the vehicle is in a danger zone and a restoring influence for restoring said apparatus when the vehicle is not in a danger zone, and means effective if the brakes are applied for independently determining the occurrence of the brake application by the action of said apparatus.

42. Automatic brake applying mechanism for train control systems comprising, in combination with the brake pipe of the usual automatic air-brake system, means for venting the brake pipe to a predetermined pressure including a reservoir charged at normal running brake pipe pressure, and a reduction reservoir having variable volume, and means including a speed responsive device driven by the wheels of the vehicle for varying the volume of said reduction reservoir.

43. Automatic mechanism acting upon the regular air-brake equipment of railway vehicles to produce an automatic application of the brakes thereof comprising, a reservoir charged at brake pipe pressure, a reduction reservoir of variable volume automatically connected to the charged reservoir when an automatic brake application is initiated, means operating automatically to vent the brake pipe down to a pressure equal to the resultant pressure in said reservoirs, and means including a speed responsive device driven from the wheels of the vehicle for varying the volume of the reduction reservoir to correspond with the existing speed of the vehicle at the time the automatic application is initiated.

44. Automatic air-brake applying mechanism for train control systems comprising, an automatic application valve, an equalizing reservoir, a plurality of reduction reservoirs, said application valve acting when operated to connect the equalizing reservoir to the reduction reservoirs and to vent the brake pipe pressure down to a value equal to the combined pressure in said reservoirs, and means dependent upon the actual speed of the vehicle for determining the number of reduction reservoirs connected to the equalizing reservoir.

45. Automatic brake applying mechanism for train control systems comprising, in combination with the brake pipe of the usual automatic air-brake system, automatic means causing an automatic application of the brakes and operable to vent the brake pipe down to a predetermined pressure dependent upon the actual speed of the vehicle at the time the automatic brake application is initiated.

46. Automatic mechanism acting upon the regular air-brake equipment of railway vehicles to produce an automatic application of the brakes thereof comprising, electrically controllable fluid pressure operated means for venting the brake pipe to a predetermined pressure, said predetermined pressure being that of the equalization pressure of a reservoir charged at brake pipe pressure and a reduction reservoir, and automatic means for varying the volume of the reduction reservoir in accordance with the actual speed of the vehicle at the time the operation of the fluid pressure means is started.

In testimony whereof I affix my signature.

LEONARD WORK.